United States Patent
Yudakov et al.

(10) Patent No.: US 8,384,901 B2
(45) Date of Patent: Feb. 26, 2013

(54) METHOD FOR THE TOMOGRAPHIC EXAMINATION OF MICROSCOPIC OBJECTS AND A SCANNING MICROSCOPE FOR THE IMPLEMENTATION THEREOF

(75) Inventors: Mihail Aleksandrovich Yudakov, Saratov (RU); Yurii Petrovich Volkov, Saratov (RU); Aleksei Olegovich Manturov, Saratov (RU)

(73) Assignee: OOO Tsentr Innovatsionnyh Tehnologii-Es, Saratov (RU)

( * ) Notice: Subject to any disclaimer, the term of this patent is extended or adjusted under 35 U.S.C. 154(b) by 0 days.

(21) Appl. No.: 13/296,676

(22) Filed: Nov. 15, 2011

(65) Prior Publication Data

US 2012/0133940 A1 May 31, 2012

Related U.S. Application Data

(63) Continuation of application No. PCT/RU2010/000243, filed on May 14, 2010.

(30) Foreign Application Priority Data

May 15, 2009 (RU) ................................. 2009118267

(51) Int. Cl.
*G01N 21/00* (2006.01)
(52) U.S. Cl. ........................ 356/432; 356/434
(58) Field of Classification Search .......... 356/432–436, 356/440, 442, 625–640; 250/336.1, 390.12–395, 250/390.06
See application file for complete search history.

(56) References Cited

FOREIGN PATENT DOCUMENTS

| RU | 2018891 | | 8/1994 |
| RU | 2097748 | C1 | 11/1997 |
| RU | 2140661 | C1 | 10/1999 |
| RU | 2180745 | C2 | 1/2001 |

OTHER PUBLICATIONS

International Search Report mailed Sep. 30, 2010 from Corresponding International application No. PCT/RU2010/000243, filed May 14, 2010.

*Primary Examiner* — Tri T Ton
(74) *Attorney, Agent, or Firm* — Preston Smirman; Smirman IP Law, PLLC

(57) ABSTRACT

The invention relates to the scan methods and means for tomographic examination of two-dimensional structure of planar objects. The invention aims at developing a method of studying nanodimensional or microscopic objects with a resolution of the order of 30 nanometer and means of implementation of such a method. The task in view is performed such that the scanning microscope comprises a radiation source 1, as well as, positioned along the radiation rays, an opaque screen 2 with a slit, an object stage 4 with a mobility device for disposing of and maneuvering with an object under examination within the scan plane 7, a radiation detector 8 connected to an information processing unit 9, wherein according to the embodiment, the opaque screen is supplied with at least one slit shutter 3 movable in the plane of the opaque screen, the slit shutter providing the variability of cross-sectional dimensions of the slit.

4 Claims, 2 Drawing Sheets

METHOD FOR THE TOMOGRAPHIC EXAMINATION OF MICROSCOPIC OBJECTS AND A SCANNING MICROSCOPE FOR THE IMPLEMENTATION THEREOF

RELATED APPLICATIONS

This application is a Continuation application of International Application PCT/RU2010/000243 filed on May 14, 2010, which in turn claims priority to Russian application No. RU2009118267 filed on May 15, 2009, both of which are incorporated herein by reference in their entirety.

FIELD OF THE INVENTION

The present invention relates to the field of materials research by means of electromagnetic radiation with subsequent imaging of the object under investigation, namely, to the scan methods and means for tomographic examination of two-dimensional structure of planar objects.

BACKGROUND OF THE INVENTION

A known radiation computed tomography technique comprises: irradiation of a test object with a flux of ionizing radiation, registration of the radiation passed along a preset number of paths through a test object which, as well as the "pack" of detectors, move relatively and angularly, transformation of the registered signals, and computerized reconstruction of the tomographic image according to a certain algorithm. The said radiation from a point source propagates in the form of fan-shaped beam and after its transit through the test object is registered by detectors located on a circular arc having the centre in the radiation source point (see Patent for Invention RU No. 2180745, IC: G01N23/04).

Though, the known technique allows to determine the structure of an object, the inner one including, the resolution characteristics depend on the size of detectors and the scanning pitch, and cannot be detailed closer than several millimeters.

In technical essence, nearest to the applied method stands the procedure of tomographic testing, comprising: scanning of a test object by a fan-shaped beam from a point source of radiation by shuttling and discretely turning the object under test, registration of the radiation intensity passed through the test object by means of a detector matrix with subsequent computer processing the obtained information, and, on its basis, reconstruction of the object internal structure. The view locality and its dimensions within a test object are preliminarily specified and then entered into a computer, after which the test object is being rapidly scanned until the moment when a border of the view locality crosses the outer ray of the fan-shaped beam that falls on the first detector of the matrix, whereupon slow scanning is performed with the scanning pitch reduced by K=D/Dл, where D is the dimension of the test object, Dл is the dimension of the view locality. The interval of reading samples from the detectors is decreased by K, while only a part of matrix detectors are activated for the registration depending on the size of the view locality (see Patent for Invention RU No. 2097748, IC: G01N23/04).

The above approach enables improvement of resolution up to a certain limit due to the reduced scanning pitch, however, detectors' geometric dimensions do not provide the required resolving ability.

A known embodiment includes a confocal scanning tomographic microscope, comprising: a primary pinpoint source of light, a mobility device for a three-dimensional test object, a condenser lens adapted to focus radiation from the primary pinpoint light source in a point inside the 3D test object positioned on the mobility device, a microobjective forming an image of the secondary light source derived from the focused radiation of the primary pinpoint source of light, a pinhole diaphragm located in the image plane of the secondary light source, and a radiation detector. The radiation detector is placed at a distance behind the pinhole diaphragm and is implemented in the form of an optical receiver matrix, and between the pinhole diaphragm and the optical receiver matrix a diffraction optical element is introduced (see Patent for Invention RU No. 2140661, IC: G02B21/00).

Nevertheless, the known embodiment configured to scan three-dimensional objects is characterized by a low resolution capability.

Most closely in technical substance, the presented device is approached by the confocal scanning microscope which comprises: a radiation source unit, an opaque screen with a slit installed together with the confocally fixed first and second focusing devices along the beam path in the microscope optical route, as well as the microscope object stage mounted on a means of mobility in the focal plane common for all these devices, and an optical receiver disposed in the image plane. To unify and simplify the microscope construction to enable imaging in a wide spectral range while maintaining an admissible energy deposition on a test sample the opaque screen with a slit is configured immobile the slit being of a rectangular shape, the object stage is rigged with a device providing linear movement of a test specimen during image formation, and the optical receiver being aligned with the slit image is configured as a line of photosensors linked to a line-by-line imaging device (see Patent for Invention RU No. 2018891, IC G02B21/00).

Just the same, resolution characteristics of the known embodiment is restricted by the width of the slit which cannot be smaller than 10 microns for the radiation applied because of diffraction.

SUMMARY OF THE INVENTION

The objective of the present invention is to develop a method of studying nanodimensional or microscopic objects with a resolution of the order of 30 nanometer and means of implementation of such a method.

The technical effect achieved by utilization of the applied invention consists in enhancement of resolution capability of a scanning microscope.

The formulated problem is solved by means of a method of object tomographic examination, which comprises scanning of a test object with a beam of electromagnetic radiation while discretely changing angular position of the object under test in reference to the electromagnetic radiation beam, registration of the intensity of radiation transited through the test object during scanning, and processing of the obtained information on the basis of which reconstruction of the object structure is carried out, wherein according to the embodiment, in the process of scanning, an electromagnetic radiation beam with discretely variable cross-sectional dimensions of the beam is formed, therewith, the measure of each modification of one of the beam cross-sectional dimensions should correspond to the required resolution characteristic, in doing so, registration of the radiation intensity is accomplish after each change of a cross-sectional dimension of the beam, while further processing computes a difference between the values of two registered intensities with obtaining a plurality of values utilized for reconstruction of the object structure. A cross section of the electromagnetic radiation beam is a rectangle with its width significantly less than its length. The width of the beam cross section is varied discretely by shifting one of the borders of the beam in successive steps from the minimum to the maximum value or by consecutive step-by-step relocation of one border of the beam from the maximum to the minimum value, accordingly. Discrete variations of the width of the beam cross-section dimensions are executed through codirectional alternate shifts of opposite borders of the beam, which enables transposition of the beam over an object.

The task in view could also be performed due to the embodiment configured such that the scanning microscope comprises a radiation source, as well as, positioned along the radiation rays, an opaque screen with a slit, an object stage with a mobility device for disposing of and maneuvering with an object under examination within the scan plane, a radiation detector connected to an information processing unit, wherein according to the embodiment, the opaque screen is supplied with at least one slit shutter movable in the plane of the opaque screen, the slit shutter providing the variability of cross-sectional dimensions of the slit. The opaque screen is equipped with a mobility device for the table transference in the plane parallel to the plane of scanning. The microscope object stage is adapted to turn in the scan plane.

BRIEF DESCRIPTION OF THE DRAWINGS

Description of the method and apparatus are illustrated by appended figures as follows.

Figure 1:
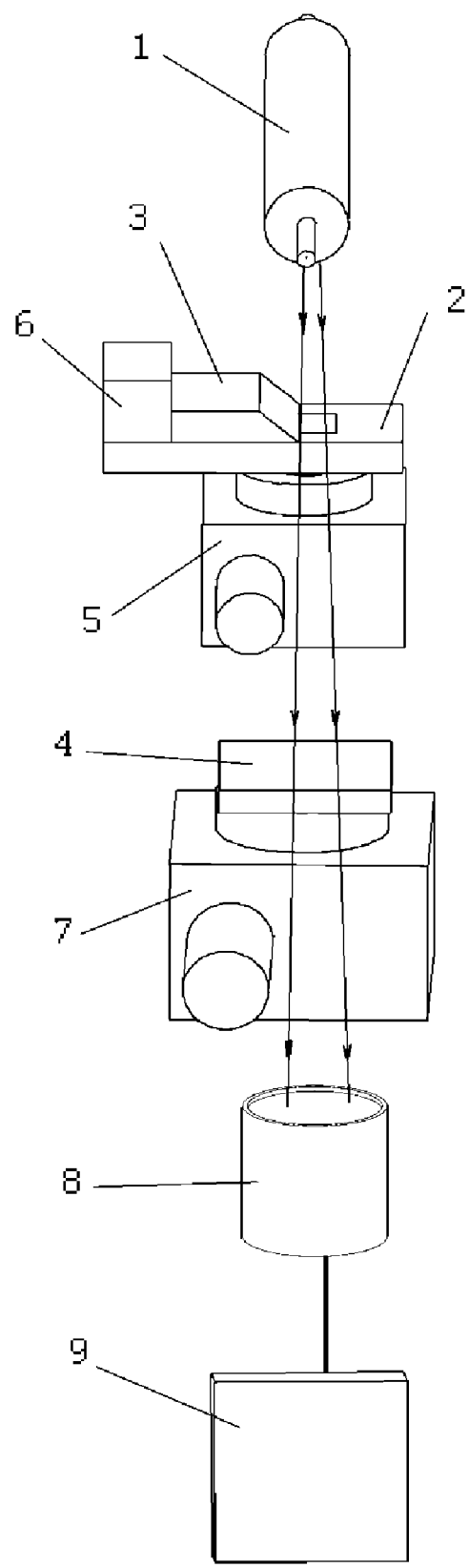
FIG. 1 shows a schematic view of a scanning tomographic microscope.
Figure 2:
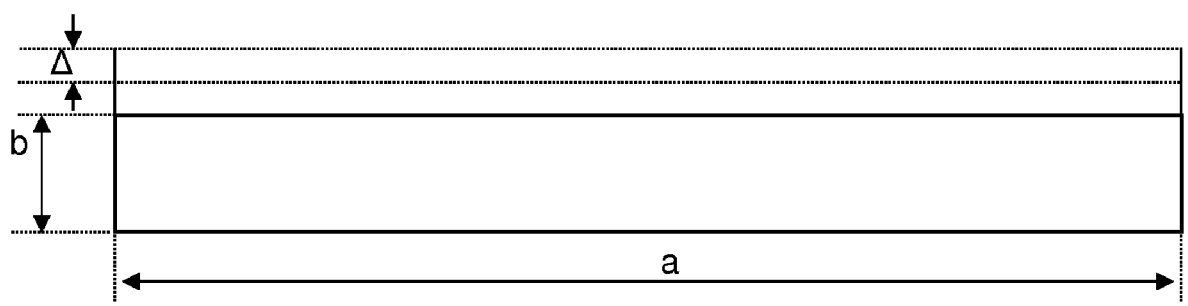
FIG. 2 gives a picture of the opaque screen slit formed by sides a and b.

The references in figures designate, accordingly:
1—radiation source;
2—opaque screen;
3—slit shutter (sliding lamina);
4—object stage;
5—opaque screen mobility device;
6—sliding lamina (shutter) mobility device;
7—object stage mobility device;
8—radiation detector;
9—information processing unit.

DETAILED DESCRIPTION OF THE PREFERRED EMBODIMENTS

For the purpose of microscopic objects' internal structure examination various types of confocal microscopes are often used. Their drawback lies in the fact that the resultant images of object inner profiles are not of tomographic origin, as in each point they represent beam-sums. In order to obtain quantitative data on the internal structure of test objects specific algorithms of tomographic reconstruction are needed. The embodiment of tomographic scanning microscope being currently applied is adapted for implementation of a method of scanning at a high resolution. According to an embodiment, a tomographic scanning microscope represents an apparatus composed of several structural elements electrically interconnected. A microscope integrates a source of electromagnetic radiation 1 providing directional propagation of a beam of electromagnetic waves of different frequency ranges and intensities, an opaque screen 2 with a slit (opening) for shaping the beam of radiation to have a desired cross section. The screen slit having a rectangular form is partially curtained by at least one radiation-nontransparent movable shutter 3 which slides within the screen plane by the agency of a mobility device 6. Slit shutter 3 is configured to be a flat element in the form of a lamina with an oblique end face. Mobility device 6 transposing shutter 3 is implemented as a piezoceramic plate electrically coupled to the information processing unit 9. The slit lateral dimensions are changed by moving the sliding lamina lengthwise the opaque screen. The minimal and maximal sizes of the slit are determined by the slit shutter shift value at a certain time instant. Opaque screen 2 is secured on a mobility device 5 providing both angular and reciprocal movement of the screen to vary the slit position in reference to the test object. Behind the opaque screen 2 at a distance specified by the wavelength of the electromagnetic radiation in use and the required resolution, object stage 4 is mounted for test specimens to be fixed on it. For example, at a wavelength of 0.65 microns the microscope object stage should be located at the distance of 10 microns from the screen. The object stage 4 is secured on a mobility device 7 which is electrically coupled with the information processing unit 9. Behind the object stage 4 radiation detector 8 is placed which is adapted to detect with its photosensitive element the radiation traversed a test object and to convert this radiation into electric charge. The detector 8 represents, for example, a photoreceiver with a light-sensitive member, which is separated from the microscope object stage by a spacing determined such that all the traversed rays would hit the photosensitive element. The photoreceiver (detector) 8 being adapted to register the intensity of radiation from the source is connected to the information processing unit 9, for instance, a computer. Thus, all the basic components of the inventive microscope are electrically coupled with the information processing unit 9 which is adapted to process the plurality of values registered by the photoreceiver and to reconstruct the test object structure on the basis of an algorithm formulated according to the inverse Radon transform method. The opaque screen and the object stage are fitted on the corresponding mobility devices in a manner that makes it possible to change the angular or linear position of both the slit in the screen and a test object upon the stage.

The method of tomographic examination of microscopic objects consists in the following. A test object is disposed and fixed on the object stage 4 which is, in turn, situated between the opaque screen 2 and the radiation detector 8. Next, the radiation source 1 is switched on, the generated electromagnetic wave being aimed at the test object through the elongate orthogonal slit (with sides a and b, where a>>b) cut in the screen 2 nontransparent for the utilized wavelengths. One of the lateral dimensions (width or length) of the rectangular slit can be changed, by which variation of the cross-sectional dimensions of the beam transiting the slit is obtained. The slit dimensions ensure free transit of radiation from the source without diffractional distortions. The thus formed electromagnetic radiation beam hits the target object under probe providing scanning. Intensity of the radiation passed through the test object lowers depending on the texture of the object under examination. The radiation thereby reduced is logged by the photoreceiver 8 whose light-sensitive area exceeds the slit dimensions. As a result of the fulfilled measurement the photoreceiver provides at its output the first average signal the value of which is registered by the information processing unit 9 for evaluation of further transformation steps. After that, a cross-sectional dimension (width b) of the slit is increased by the Δ value which corresponds to the required resolution (about several nm). The minimal change value Δ for the slit width depends on sensitivity of the radiation detector 8. Radiation passed through the enlarged slit and the test object is again logged by the radiation detector resulting in the second average signal the value of which is also registered by the information processing unit 9. The succession of values registered by the processing unit 9 are further transformed according to a definite algorithm to obtain a value corresponding to the radiation passed through the slit of Δ in width. The registered value corresponding to the first signal is subtracted from the registered value corresponding to the second signal. The resultant is the value of radiation capable of traversing the slit with the width of Δ. Due to iteration, the movable slit shutter is slid expanding the screen slit cross-sectional dimension by the value of 2Δ, 3Δ, 4Δ, and etc. As a result, a one-dimensional array of average signal values is obtained for sectional areas a×Δ of a given test object, which are shifted in relation to the area of the first measurement to the distance of 2Δ, 3Δ, 4Δ, and etc., accordingly. The maximal slit width is defined by the expression b+nΔ, where n is the maximum number of changes of the slit width, which number depends on the characteristics of a given radiation detector, in particular, on the photoreceiver saturation threshold achieving which a signal of the radiation which have transited the slit a×(b+nΔ) does not differ from a signal received at the slit dimensions of a×(b+[n+1]Δ).

Alternatively, slit dimensions can be changed another way. It becomes possible due to the opaque screen with a slit configured such that two opposite sliding laminae 3 are arranged in relation to the opening in the screen. After registration of the first average signal which has passed through the slit of a×b dimensions, and the second average signal which has passed through the slit of a×(b+Δ) dimensions, which dimensions were obtained by sliding one slit shutter in the direction of the slit gain for the Δ value, the slit dimensions should be changed as follows: the second, opposite, slit shutter is to be slid in the direction of the slit's changing size reduction for the Δ value. Thereafter, the radiation is also logged by the detector 8 and iteration is continued. Application of the above version of the slit dimensions variation results in gradual scanning of an object through slits with alterable lateral dimension of b, b+Δ, b, b+Δ, and etc.

In case an object size exceeds the extension limits of the slit, the test object is to be transposed together with the object stage and scanning is to be continued till obtaining a valuable picture.

On completion of scanning with linear resizing of the slit the opaque screen is repositioned at a specified angle with reference to the tested specimen, and all the preceding operations are repeated. Test object scanning accompanied by the slit lateral resizing should be performed after each angular repositioning of the opaque screen and the sequential angular displacement of the screen slit. The ensuing output of the radiation detector represents an array of signal values which correspond to a specified angular and linear removal. After the plurality of measured values have been converted, a two-dimensional image of the test object structure is obtained.

An embodiment of the inventive scanning microscope operates as follows. All the structural assemblies of the microscope should be configured such that the distance between them is predetermined by the applied type of electromagnetic radiation and degree of scan resolution. A test object should be disposed and secured on the object stage. In front of the object stage with a test object on it an opaque screen with an aperture is introduced. The mobility device 7 serves to orient the microscope object stage 4 so that the area of concern inside the object is positioned under the aperture in the opaque screen 2. The slit shutter 3 partially closes the aperture in the screen 2 leaving a possibly minimal narrow slot providing unobstructed transit of beams from the source 1 onto the test object disposed upon the specimen stage 4. Then, the source 1 should be activated to generate radiation which is to be guided to the disposition of the object under examination. The radiation passes through the slot. Due to this a cross section of the radiation beam is formed, which beam is to traverse the object under examination. Subsequent to the object stage with a specimen on it the radiation detector 8 is installed which is configured to log an average intensity of the radiation caught the photosensitive zone. The information processing unit 9 registers the value of the output signal $f_0$ of the radiation detector 8 for further processing. Next, the device 6 should be engaged to move the shutter 3 for the value Δ, agreeing with the required resolution, to expand a lateral dimension of the slit in the opaque screen. All other components of the inventive apparatus should remain stationary. The average radiation should again be registered as it has passed through the test object and fallen on the photosensitive zone of the radiation detector 8. The value of the output signal $f_1$ is registered by the information processing unit 9, whereupon computations are made, wherein the values of the preceding signal $f_0$ are subtracted from the values of the last registered signal $f_1$. The computed result $\Delta f_1$ is registered by the information processing unit 9 together with the related coordinates of the slit. Thereafter, the device 6 is actuated to shift again the movable shutter 3 for the same value Δ that expands the slit width up to the value b+2Δ, followed by repeat of the procedures of logging radiation and registering signal $f_2$ values, calculating the difference of values $f_2$ and $f_1$, and comparing the computed result of $\Delta f_2$ with the corresponding coordinates of the slit. The previously described operations should be repeated until the slit size gains its possible maximum, which value is to be determined by the level of sensitivity of the radiation detector photosensitive zone. This results in an array of values, each value being associated with definite coordinates of the slit and describes a certain segment of the object under examination. Upon termination of the linear scanning process the movable shutter 3 should be drawn into the initial position, whereupon the mobility device 5 is engaged to transfer the opaque screen 2 in the direction of the mobile shutter movement for the slit extension. Then, the cycle of linear scanning is repeated with the similar variation of slit dimensions and obtaining another array of output signal values. That is, the transfer of the opaque screen in the plane of its location alongside with the changes of the slit linear position make up the first phase of object scanning which results in a plurality of values Δf, derived from the results of computations and transformations of output signal measured values captured by the photosensitive zone of the radiation detector.

Further, the mobility device 5 should be switched on to turn the opaque screen 2 to a preset corner (0.01° to 1°) and to gain a new set (a one-dimensional matrix) of values Δf conforming to the new fit angle of the screen 2 in reference to the object stage 4 with a test object on it. The number of angular positions is determined by the resolution characteristics and can vary from 180 to several thousand. Such measurements provide a plurality of values (multidimensional array) Δf which are subject to mathematical evaluation using the method of inverse Radon transform resulting in re-creation of the two-dimensional structure of a given examination object.

An embodiment of the inventive scanning microscope is configured to adapt radiation sources of a wide range of wavelengths from infra-red to x-ray radiation, provided that a suitable photodetector is used.

Exemplary Practical Realization

The exemplary implementation of scanning microscope is configured such that it comprises as a radiation source an iodic lamp generating wavelengths within 206 to 500 nanometer, manufactured by LKB (Sweden). For the opaque screen a silicon plate is utilized. The screen has a through slot sized 3×3 mm cut using methods of microlithography, partially closed by a silicon plate (shutter) having 3×5 mm dimensions. To transfer the movable shutter within the plane of the opaque screen a piezomotor PQYY is used made of piezoelectric ceramics of PIC 151 grade produced by the Physical Instrument company (Germany), the piezomotor providing the maximum movement path of 100 micron with a 1-nanometer discrete step. To move the opaque screen with reference to the microscope object stage with a test object on it a piezomotor PQYY with similar characteristics is used. According to the embodiment, for the opaque screen angular displacement a high-precision rotary table NR360S, a product of the Thor-Labs USA, is employed enabling maximum angular displacement of 360° by discrete steps less than 0.01°. Mobility of the microscope object stage is provided by a nanopositioner MAX301, fabricated by the ThorLabs USA, allowing the maximum travel of 4 mm with 5-nm accuracy. The functions of the radiation detector are performed by the photoelectronic multiplier R6925, Hamamatsu, featuring: dark anode current—below 5 nA, anode sensitivity—1250 A/lm, spectral selectivity band—200-800 nm. The exemplary inventive device is configured to build a two-dimensional image of a test object (a bacterial cell slice) providing a resolution not lower than 30 nanometer.

What is claimed is:

1. A method of tomographic examination of objects, comprising:
   providing a source of transmittable electromagnetic radiation;
   scanning an object with a beam of electromagnetic radiation emanating from the source of transmittable electromagnetic radiation;
   providing a single radiation detector, wherein the detector is positioned at a distance from the source of electromagnetic radiation such that all of the transmitted electromagnetic radiation is received by the detector;
   discretely changing the object's angular position with reference to the electromagnetic radiation beam;
   registering the intensity of radiation passed through the object during scanning; and
   processing the obtained information to reconstruct the object's structure;
   wherein during scanning, formation of an electromagnetic radiation beam with discretely variable cross-sectional dimensions of the beam is performed;
   wherein the measure of each modification of one of the beam's cross-sectional dimensions corresponds to a required resolution characteristic;
   wherein registration of the radiation intensity is accomplished after each change of the cross-sectional dimension of the beam, and in the course of processing, a difference of two registered intensity values is found with obtaining a plurality of values to be applied for reconstruction of the object's structure.

2. The method according to claim 1, wherein the cross section of the electromagnetic radiation beam represents a rectangle, the width of which is smaller than its length.

3. The method according to claim 2, wherein the width of the beam cross section is varied discretely by shifting at least one border of the beam in successive steps from a minimum to a maximum value or by shifting one of the borders of the beam in successive steps from the maximum to the minimum value.

4. The method according to claim 3, wherein discrete variations of the width of the beam cross-section dimensions are executed through codirectional alternate shifts of opposite borders of the beam, which enables transposition of the beam over the object.

* * * * *